United States Patent
Miao et al.

(10) Patent No.: US 12,526,081 B2
(45) Date of Patent: Jan. 13, 2026

(54) INFORMATION TRANSMISSION METHOD, TERMINAL AND NETWORK SIDE DEVICE

(71) Applicant: DATANG MOBILE COMMUNICATIONS EQUIPMENT CO., LTD., Beijing (CN)

(72) Inventors: Jinhua Miao, Beijing (CN); Pierre Bertrand, Beijing (CN); Li Chen, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 418 days.

(21) Appl. No.: 18/004,874

(22) PCT Filed: Aug. 3, 2021

(86) PCT No.: PCT/CN2021/110325
§ 371 (c)(1),
(2) Date: Jan. 9, 2023

(87) PCT Pub. No.: WO2022/028417
PCT Pub. Date: Feb. 10, 2022

(65) Prior Publication Data
US 2023/0361934 A1     Nov. 9, 2023

(30) Foreign Application Priority Data
Aug. 7, 2020  (CN) .......................... 202010791006.0

(51) Int. Cl.
*H04L 1/1812*   (2023.01)
*H04L 5/00*     (2006.01)

(52) U.S. Cl.
CPC .......... *H04L 1/1816* (2013.01); *H04L 5/0055* (2013.01)

(58) Field of Classification Search
CPC ... H04L 1/1816; H04L 5/0055; H04L 1/1678; H04L 1/1893; H04L 1/1822; H04L 1/1607; H04L 1/1812
See application file for complete search history.

(56) References Cited

U.S. PATENT DOCUMENTS

2018/0176945 A1   6/2018  Cao
2018/0270807 A1*  9/2018  Salem ............... H04W 72/0446
(Continued)

FOREIGN PATENT DOCUMENTS

CN    107667565 A  *  2/2018   ........... H04W 72/20
CN    109391372 A     2/2019
(Continued)

OTHER PUBLICATIONS

Extended European Search Report for the corresponding European Patent Application No. 21853406.3 issued by the US Patent Office on Oct. 31, 2023.
(Continued)

*Primary Examiner* — Atique Ahmed
(74) *Attorney, Agent, or Firm* — Ladas & Parry, LLP

(57) ABSTRACT

This disclosure provides an information transmission method, a terminal and a network side device. The method includes: receiving, from a network side device, feedback information for a first uplink data; determining, according to the feedback information, an identifier of a first hybrid automatic repeat request (HARQ) process corresponding to the first uplink data not successfully received by the network side device; and performing data retransmission according to the identifier of the first HARQ process, where the retransmission data includes the identifier of the first HARQ process.

16 Claims, 5 Drawing Sheets

(56) References Cited

U.S. PATENT DOCUMENTS

| | | |
|---|---|---|
| 2019/0215104 A1 | 7/2019 | Salem et al. |
| 2020/0106565 A1* | 4/2020 | Li ..................... H04W 74/0808 |
| 2020/0177322 A1 | 6/2020 | Xu et al. |
| 2020/0178273 A1 | 6/2020 | Lu et al. |
| 2021/0136729 A1* | 5/2021 | Yasukawa ............. H04L 1/1887 |
| 2021/0219322 A1* | 7/2021 | Chin ..................... H04W 72/23 |
| 2021/0242980 A1 | 8/2021 | Zhang |
| 2022/0303064 A1* | 9/2022 | Yang ..................... H04L 1/1896 |

FOREIGN PATENT DOCUMENTS

| | | | |
|---|---|---|---|
| CN | 109392099 A | 2/2019 | |
| CN | 110830179 A | 2/2020 | |
| CN | 110830180 A | 2/2020 | |
| EP | 3668169 A1 * | 6/2020 | ........... H04L 1/1896 |
| WO | 2018123950 A1 | 7/2018 | |
| WO | 2020033689 A1 | 2/2020 | |
| WO | WO-2021062840 A1 * | 4/2021 | ............ H04W 72/23 |

OTHER PUBLICATIONS

International Search Report for PCT/CN2021/110325 issued on Oct. 28, 2021 and its English Translation provided by WIPO.
Written Opinion for PCT/CN2021/110325 issued on Oct. 28, 2021 and its English Translation provided by WIPO.
International Preliminary Report on Patentibily for PCT/CN2021/110325 issued on Feb. 7, 2023, and its English translation provided by WIPO.
First Office Action and search report for the corresponding Chinese Patent Application No. 202010791006.0 issued on Oct. 14, 2022, and it's English translation provided by foreign associate.

* cited by examiner

INFORMATION TRANSMISSION METHOD, TERMINAL AND NETWORK SIDE DEVICE

CROSS-REFERENCE TO RELATED APPLICATIONS

The present application is a U.S. national phase application of a PCT Application No. PCT/CN2021/110325 filed on Aug. 3, 2021, which claims a priority to Chinese patent application No. 202010791006.0 filed in China on Aug. 7, 2020, disclosures of which are incorporated herein by reference in their entireties.

TECHNICAL FIELD

The present disclosure relates to the field of communication technologies, and in particular, to an information transmission method, a terminal, and a network side device.

BACKGROUND

In New Radio (NR), the network side pre-configures some uplink (UL) resources, such as configured grant (CG) resource, to facilitate the transmission of services with strict latency requirements or services with relatively regular service formats on these configured UL resources. On the unlicensed spectrum, terminal devices and network devices can only send data on a channel when it is detected that the channel is in an idle state. When the network side fails to decode the UL data packet of user equipment (UE), the network side cannot know the hybrid automatic repeat request (HARQ) process ID of the UE, and therefore cannot index the uplink data of the UE by the HARQ process ID to schedule retransmission. If the UE calculates the HARQ process ID based on time, if the UE cannot send the data during retransmission on the UL resources scheduled by the base station, the UE has to wait for the network side to perform the retransmission scheduling again. This will result in the increase of the retransmission latency.

SUMMARY

The present disclosure provides an information transmission method, a terminal and a network side device, to solve the problem of increased data transmission latency caused by the existing data retransmission mechanism.

An embodiment of the present disclosure provides an information transmission method, performed by a terminal, including:
  receiving, from a network side device, feedback information for a first uplink data;
  determining, according to the feedback information, an identifier of a first hybrid automatic repeat request (HARQ) process corresponding to the first uplink data not successfully received by the network side device; and
  performing data retransmission according to the identifier of the first HARQ process,
  where the retransmission data includes the identifier of the first HARQ process.
  Optionally, the feedback information is used for scheduling retransmission of the first uplink data;
  or,
  the feedback information is used for indicating that transmission of the first uplink data is unsuccessful.
  Optionally, an initial transmission of the first HARQ process is transmitted on a configured grant (CG) resource; or
  the initial transmission of the first HARQ process is transmitted on a dynamic grant (DG) resource.
  Optionally, the performing data retransmission according to the identifier of the first HARQ process includes:
  performing data retransmission, according to the identifier of the first HARQ process, on a resource indicated by the feedback information, where the feedback information includes resource indication information for data retransmission; or
  performing retransmission, according to the identifier of the first HARQ process, on a CG resource.
  Optionally, the feedback information includes a sending time of the first uplink data;
  the determining, according to the feedback information, the identifier of the first HARQ process corresponding to the first uplink data not successfully received by the network side device includes:
  determining, according to the sending time of the first uplink data, the identifier of the first HARQ process corresponding to the sending time of the first uplink data.
  Optionally, the feedback information includes a second HARQ process identifier;
  the determining, according to the feedback information, the identifier of the first HARQ process corresponding to the first uplink data not successfully received by the network side device includes:
  determining, according to the second HARQ process identifier, the identifier of the first HARQ process corresponding to the second HARQ process identifier.
  Optionally, the determining, according to the second HARQ process identifier, the identifier of the first HARQ process corresponding to the second HARQ process identifier includes:
  determining, according to the second HARQ process identifier, the sending time of the first uplink data;
  determining, according to the sending time of the first uplink data, the identifier of the first HARQ process corresponding to the sending time of the first uplink data.
  Optionally, the performing data retransmission according to the identifier of the first HARQ process includes:
  determining, according to the identifier of the first HARQ process, a CG resource or a DG resource corresponding to the identifier of the first HARQ process;
  performing retransmission of the first uplink data on the determined CG resource or DG resource.
  Optionally, the second HARQ process identifier is indicated by target bit information in the feedback information; or
  the second HARQ process identifier is carried by an HARQ process identifier field in the feedback information.
  Optionally, the feedback information includes index information of a configured grant (CG);
  the determining, according to the feedback information, the identifier of the first HARQ process corresponding to the first uplink data not successfully received by the network side device includes:
  determining, according to the index information of the CG, a CG resource used for sending the first uplink data;

determining, according to the CG resource, the identifier of the first HARQ process corresponding to the CG resource.

Optionally, the feedback information includes: a new data indicator (NDI), and/or a redundancy version identifier (RV ID).

Optionally, that the first uplink data is not successfully received by the network side device is caused by a target situation;

the target situation includes at least one of following:
listen before talk (LBT) failure; or
a priority of an initial transmission of the first uplink data is lowered.

An embodiment of the present disclosure provides an information transmission method, performed by a network side device, including:

sending feedback information to a terminal in case that the network side device fails to receive an identifier of a first hybrid automatic repeat request (HARQ) process corresponding to a first uplink data;

receiving retransmission data sent by the terminal, where the retransmission data includes the identifier of the first HARQ process.

Optionally, the feedback information is used for scheduling retransmission of the first uplink data;

or, the feedback information is used for indicating that the transmission of the first uplink data is unsuccessful.

Optionally, an initial transmission of the first HARQ process is transmitted on a configured grant (CG) resource; or the initial transmission of the first HARQ process is transmitted on a dynamic grant (DG) resource.

Optionally, the receiving retransmission data sent by the terminal includes:

receiving retransmission data on resource indicated by the feedback information, where the feedback information includes: resource indication information for data retransmission; or, receiving retransmission data sent by the terminal on a CG resource.

Optionally, the feedback information includes: a sending time of the first uplink data.

Optionally, the feedback information includes: a second HARQ process identifier.

Optionally, in case that the network side device fails to receive the identifier of the first HARQ process corresponding to the first uplink data, prior to sending feedback information to the terminal, the method further includes:

determining the second HARQ process identifier according to the sending time of the first uplink data.

Optionally, the second HARQ process identifier is indicated by target bit information in the feedback information; or the second HARQ process identifier is carried by an HARQ process identifier field in the feedback information.

Optionally, the feedback information includes: index information of a configured grant (CG).

Optionally, in case that the network side device fails to receive the identifier of the first HARQ process corresponding to the first uplink data, prior to sending feedback information to the terminal, the method further includes:

determining the index information of the configured grant (CG) according to a time domain position where the network side device fails to receive the identifier of the first HARQ process.

Optionally, the feedback information includes: a new data indicator NDI, and/or a redundancy version identifier RV ID.

An embodiment of the present disclosure provides a terminal, including: a transceiver, a memory, a processor, and a computer program stored in the memory and configured to be executed by the processor, where the processor is configured to execute the computer program to implement following steps:

receiving, from a network side device, feedback information for a first uplink data;

determining, according to the feedback information, an identifier of a first hybrid automatic repeat request (HARQ) process corresponding to the first uplink data not successfully received by the network side device; and performing data retransmission according to the identifier of the first HARQ process, where the retransmission data includes the identifier of the first HARQ process.

Optionally, the feedback information is used for scheduling retransmission of the first uplink data;

or, the feedback information is used for indicating that transmission of the first uplink data is unsuccessful.

Optionally, an initial transmission of the first HARQ process is transmitted on a configured grant (CG) resource; or the initial transmission of the first HARQ process is transmitted on a dynamic grant (DG) resource.

Optionally, the performing data retransmission according to the identifier of the first HARQ process includes:

performing data retransmission, according to the identifier of the first HARQ process, on a resource indicated by the feedback information, where the feedback information includes: resource indication information for data retransmission; or performing retransmission, according to the identifier of the first HARQ process, on a CG resource.

Optionally, the feedback information includes a sending time of the first uplink data;

the determining, according to the feedback information, the identifier of the first HARQ process corresponding to the first uplink data not successfully received by the network side device specifically includes:

determining, according to the sending time of the first uplink data, the identifier of the first HARQ process corresponding to the sending time of the first uplink data.

Optionally, the feedback information includes a second HARQ process identifier;

the determining, according to the feedback information, the identifier of the first HARQ process corresponding to the first uplink data not successfully received by the network side device specifically includes:

determining, according to the second HARQ process identifier, the identifier of the first HARQ process corresponding to the second HARQ process identifier.

Optionally, the determining, according to the second HARQ process identifier, the identifier of the first HARQ process corresponding to the second HARQ process identifier specifically includes:

determining, according to the second HARQ process identifier, the sending time of the first uplink data;

determining, according to the sending time of the first uplink data, the identifier of the first HARQ process corresponding to the sending time of the first uplink data.

Optionally, the performing data retransmission according to the identifier of the first HARQ process specifically includes:
  determining, according to the identifier of the first HARQ process, a CG resource or a DG resource corresponding to the identifier of the first HARQ process;
  performing retransmission of the first uplink data on the determined CG resource or DG resource.

Optionally, the second HARQ process identifier is indicated by target bit information in the feedback information; or
  the second HARQ process identifier is carried by an HARQ process identifier field in the feedback information.

Optionally, the feedback information includes index information of a configured grant (CG);
  the determining, according to the feedback information, the identifier of the first HARQ process corresponding to the first uplink data not successfully received by the network side device specifically includes:
  determining, according to the index information of the CG, a CG resource used for sending the first uplink data;
  determining, according to the CG resource, the identifier of the first HARQ process corresponding to the CG resource.

Optionally, the feedback information includes: a new data indicator NDI, and/or a redundancy version identifier RV ID.

Optionally, that the first uplink data is not successfully received by the network side device is caused by a target situation;
  the target situation includes at least one of following:
  listen before talk (LBT) failure; or
  a priority of an initial transmission of the first uplink data is lowered.

An embodiment of the present disclosure provides a network side device, including: a transceiver, a memory, a processor, and a computer program stored in the memory and configured to be executed by the processor, where the processor is configured to execute the computer program to implement following steps:
  sending feedback information to a terminal in case that the network side device fails to receive an identifier of a first hybrid automatic repeat request (HARQ) process corresponding to a first uplink data;
  receiving retransmission data sent by the terminal, where the retransmission data includes the identifier of the first HARQ process.

Optionally, the feedback information is used for scheduling retransmission of the first uplink data;
  or,
  the feedback information is used for indicating that the transmission of the first uplink data is unsuccessful.

Optionally, an initial transmission of the first HARQ process is transmitted on a configured grant (CG) resource; or
  the initial transmission of the first HARQ process is transmitted on a dynamic grant (DG) resource.

Optionally, the receiving retransmission data sent by the terminal specifically includes:
  receiving retransmission data on a resource indicated by the feedback information, where the feedback information includes resource indication information for data retransmission; or,
  receiving retransmission data sent by the terminal on a CG resource.

Optionally, the feedback information includes: a sending time of the first uplink data.

Optionally, the feedback information includes: a second HARQ process identifier.

Optionally, the processor is further used for:
  determining, according to the sending time of the first uplink data, the second HARQ process identifier.

Optionally, the second HARQ process identifier is indicated by target bit information in the feedback information; or
  the second HARQ process identifier is carried by an HARQ process identifier field in the feedback information.

Optionally, the feedback information includes: index information of a configured grant (CG).

Optionally, the processor is further used for:
  determining the index information of the configured grant (CG) according to a time domain position where the network side device fails to receive the identifier of the first HARQ process.

Optionally, the feedback information includes: a new data indicator NDI, and/or a redundancy version (RV) identifier (ID).

An embodiment of the present disclosure provides a terminal, including:
  a first receiving module, configured to receive, from a network side device, feedback information for a first uplink data;
  a first determining module, configured to determine, according to the feedback information, a first hybrid automatic repeat request (HARQ) process identifier corresponding to the first uplink data not successfully received by the network side device; and
  a transmission module, configured to perform data retransmission according to the identifier of the first HARQ process,
  where the retransmission data includes the identifier of the first HARQ process.

An embodiment of the present disclosure provides a network side device, including:
  a first sending module, configured to send feedback information to a terminal in case that the network side device fails to receive an identifier of a first hybrid automatic repeat request (HARQ) process corresponding to a first uplink data; and
  a second receiving module, configured to receive retransmission data sent by the terminal, where the retransmission data includes the identifier of the first HARQ process.

An embodiment of the present disclosure provides a computer-readable storage medium storing thereon a computer program, where the computer program is configured to be executed by a processor to implement steps of the above-mentioned information transmission methods.

The beneficial effects of the above-mentioned technical solution of the present disclosure are:
  when receiving the feedback information for the first uplink data from the network side device, the terminal can determine, according to the feedback information, the identifier of the first HARQ process for sending the first uplink data, and perform data retransmission according to the identifier of the first HARQ process, so that the network side device can perform retransmission scheduling of the uplink data even if the network side device cannot successfully receive the identifier of the first HARQ process.

DETAILED DESCRIPTION

Figure 1:
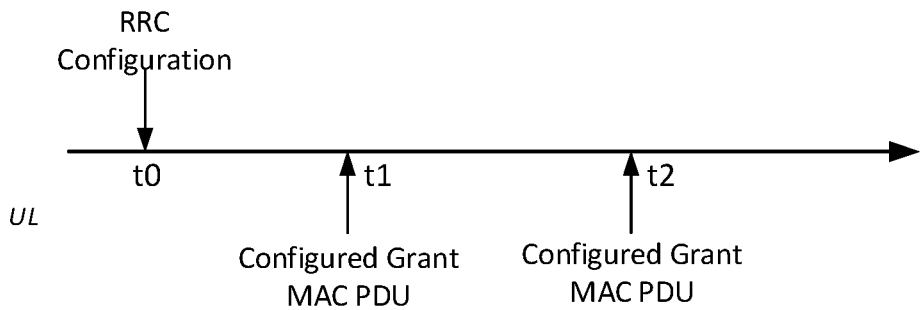
FIG. 1 is a schematic view of a data transmission process of configured grant type 1 and configured grant type 2.

In order to make the technical problems, technical solutions and advantages to be solved by the present disclosure clearer, the following will be described in detail with reference to the drawings and specific embodiments. In the following description, specific details such as specific configurations and components are provided only to facilitate a comprehensive understanding of the embodiments of the present disclosure. Therefore, those skilled in the art should recognize that various changes and modifications of the embodiments described herein can be made without departing from the scope and spirit of the present disclosure. In addition, descriptions of well-known functions and constructions are omitted for clarity and conciseness.

It should be understood that reference throughout the specification to "one embodiment" or "an embodiment" means that a particular feature, structure or characteristic related to the embodiment is included in at least one embodiment of the present disclosure. Thus, usages of "in one embodiment" or "in an embodiment" in various places throughout the specification do not necessarily refer to the same embodiment. Furthermore, the particular features, structures or characteristics may be combined in any suitable manner in one or more embodiments.

In various embodiments of the present disclosure, it should be understood that the sequence numbers of the following processes do not mean the order of execution, and the execution order of each process should be determined by its functions and internal logic, and should not constitute any limitation on the implementation process of the embodiments of the present disclosure.

The term "and/or" in the embodiments of the present disclosure describes the association relationship of associated objects, and indicates that there may be three relationships, for example, A and/or B may indicate three situations: A exists alone, A and B exist simultaneously, and B exists alone. The symbol "/" generally indicates that the objects connected by the symbol are in an "or" relationship. In the embodiments provided in the present disclosure, it should be understood that expression "B corresponding to A" means that B is associated with A, and B can be determined according to A. However, it should also be understood that determining B based on A does not mean that B is determined based solely on A, but may mean that B may be determined based on A and/or other information.

In embodiments of the present disclosure, the form of the access network is not limited, and may be access network including a macro base station, a pico base station, a Node B (the name of a 3G mobile base station), an enhanced base station (eNB), home enhanced base station (Femto eNB or Home eNode B or Home eNB or HeNB), relay station, access point, remote radio unit (RRU), remote radio head (RRH), etc. A user terminal may be a mobile phone (or cell phone), or other device capable of sending or receiving wireless signals, including user equipment, personal digital assistant (PDA), wireless modem, wireless communication device, handheld device, laptop computer, cordless phone, wireless local loop (WLL) station, customer premise equipment (CPE, customer terminal) that can convert mobile signals into WiFi signals, or mobile smart hotspot, smart home appliance, or others devices that can communicate with mobile communication networks spontaneously without human intervention, etc.

Before describing the embodiments of the present disclosure, some concepts used in the following description are explained first.

1) Configured Grant Transmission

In NR, some UL resources will be pre-configured on the network side to facilitate transmissions of services with strict latency requirements (such as ultra reliable low latency communications (URLLC)) or services with relatively regular service formats (such as voice over Internet Protocol (VoIP) service) on these configured UL resources.

Configured grant type1 and configured grant type2 are two types of scheduling methods. They share the same feature that the base station will pre-allocate periodic resource locations, and the UE will send data according to the resource locations allocated by the base station. The difference therebetween is as follows.

With respect to configured grant type1, resource location, modulation coding scheme (MCS), resource block (RB) size, HARQ quantity, periodicity and the like are configured through radio resource control (RRC), and will take effect once configured through RRC, with no need for physical layer activation and deactivation processes.

With respect to configured grant type2, resource location, HARQ quantity, and periodicity are also configured through RRC, but RB and MCS are not configured through RRC. Meanwhile, downlink control information (DCI) sent on the physical layer is required to activate and deactivate resources.

The HARQ ID in configured grant type1 and configured grant type2 ranges from 0 to N−1, where N is the quantity of HARQ processes scheduled for configured grant type1 and configured grant type2 through RRC configuration. It can be seen that the HARQ processes of configured grant type1 and configured grant type2 also include ID 0. The data sending process of configured grant type1 and configured grant type2 is shown in FIG. 1, where MAC denotes media access control, and PDU denotes packet data unit.

When configuring uplink configured grant type1, gNB will configure the following parameters:

CS (Configured Scheduling)-RNTI: radio network temporary identifier (RNTI) used for retransmission in the type1;
periodicity: periodicity of the configured grant;
Nrof HARQ-Processes (quantity of HARQ processes): the quantity of HARQs used by the configured grant;
time Domain Offset: the resource offset from SFN=0 in the time domain;
time Domain Allocation: time domain allocation of the uplink configured grant, including the start symbol and length.

For configured grant type2, gNB will configure the following parameters:
CS-RNTI: used to indicate the RNTI used in retransmission, and activation and deactivation of the type2;
periodicity: periodicity of the configured grant; and
Nrof HARQ-Processes: quantity of HARQs used by the configured grant;
and the physical layer DCI is used to indicate the resource starting position (the starting position is the PUSCH initialization/re-initialization position indicated in the DCI), the time-frequency domain resource position and the like of configured grant type 2.

2) HARQ Process ID Calculation for Configured Grant

In the NR system, in order to save the physical downlink control channel (PDCCH) control overhead, the network side will allocate some pre-configured resources. The periodicity and resource locations of these configured resources are allocated by the network side once and reused multiple times.

In order to better match the retransmission scheduling, the standard specifies the matching relationship between the HARQ process ID and the configured resources. Taking the NR system as an example, the calculation formula of the HARQ process ID is:

HARQ Process ID=[floor(CURRENT_slot×10/
(Number Of Slots Per Frame×periodicity))]%
Nrof HARQ-Processes,  Downlink (DL):

where CURRENT_slot=[(SFN×Number Of Slots Per Frame)+slot number in the frame], Number Of Slots Per Frame denotes the quantity of continuous time slots in each frame, and slot number in the frame denotes the serial number of a slot in the transmission process, SFN (System Frame Number) denotes the system frame number;

HARQ Process ID=[floor(CURRENT_symbol/periodicity)]% nrof HARQ-Processes,  UL:

where CURRENT_symbol denotes the index of the first symbol of a UL transmission slot.

3) UE HARQ Process ID Allocation Method in New Radio in Unlicensed Spectrum (NR-U, 5G Air Interface Operating in the Unlicensed Frequency Band)

In NR-U, since the channel is preempted, terminal devices and network devices can only send data on the channel when they detect that the channel is in an idle state. When sending data of configured grant, if the UE calculates the HARQ process ID based on time according to related art, then when retransmitting, if the data cannot be sent on the UL resource scheduled by the base station, the UE needs to wait for the network side to perform the retransmission scheduling again. This will result in the increase of retransmission latency.

If the UE adopts the automatic retransmission mode of CG, then the UE can only select the CG transmission occasion with the same HARQ process ID as the current HARQ process ID. However, if a listen before talk (LBT) failure occurs on the retransmission CG, then the UE can only wait until the next CG occasion with the same ID as the current CG HARQ process ID, which will also increase the retransmission latency. During the CG initial transmission process, if the HARQ process corresponding to the current CG occasion is always occupied, the UE cannot perform the corresponding new transmission, which will also increase the latency of data transmission. Therefore, in the NR-U system, the UE autonomously selects the HARQ process ID, and when sending the physical uplink shared channel (PUSCH), carries the HARQ process ID selected by the UE in a UL control indication, such as the uplink control information (UCI), so that the base station can obtain the HARQ process ID of the UE while obtaining the UCI.

4) Retransmission Mechanism in NR-U

In NR-U, when the network side fails to decode the UE UL data packet, the HARQ process ID of UE cannot be known, so the network side cannot schedule retransmission by indexing the UE UL data through the HARQ process ID. Therefore, in NR-U, the network side performs retransmission in an automatic retransmission mode of configured grant. Meanwhile, a CG retransmission timer is introduced. For example, when the UE sends a data packet 1 at CGm, the UE starts the CG retransmission timer. If the network side fails to decode the data packet 1, the HARQ process ID of the UE cannot be known, thus, the UE finds another available CG slot to retransmit the data packet 1 after the CG retransmission timer expires.

The present disclosure provides an information transmission method, a terminal, and a network side device, to solve the problem of increased data transmission latency caused by the data retransmission mechanism.

The technical solutions in the embodiments of the present disclosure will be clearly and completely described below in conjunction with the drawings in the embodiments of the present disclosure, obviously, the described embodiments are only some of the embodiments of the present disclosure, rather than all of embodiments. Based on the embodiments in the present disclosure, all other embodiments obtained by those ordinarily skilled in the art without making creative efforts belong to the scope of the present disclosure.

Figure 2:
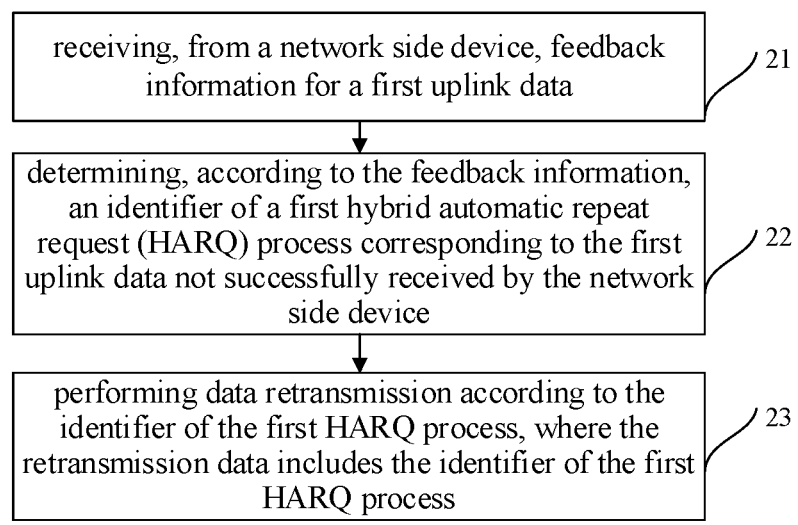
FIG. 2 is a flowchart of an information transmission method according to an embodiment of the present disclosure.

As shown in FIG. 2, an embodiment of the present disclosure provides an information transmission method, which is performed by a terminal, and specifically includes the following steps 21, 22 and 23.

Step 21: receiving, from a network side device, feedback information for a first uplink data.

When the terminal sends uplink transmission, in case that the network side device cannot successfully receive the first uplink data, the network side device sends feedback information to the terminal. The failure to successfully receive the first uplink data may include: the network side device cannot parse out the first uplink data, but can determine the identifier of the first HARQ process used by the first uplink data, where the identifier of the first HARQ process is, for example, a first HARQ process index; or, the network side device can neither parse out the first uplink data nor determine the identifier of the first HARQ process.

For example: UE sends UL data at CG0 occasion: UE selects an HARQ process in the HARQ process resource pool, it is assumed that the selected HARQ process has the first HARQ process ID (that is, the identifier of the first HARQ process), and carries the first HARQ process ID in the first uplink data. The UE carries the first HARQ process ID in the CG-UCI, and multiplexes the CG-UCI into the UL data. When the network side device only detects that the UE sends data at CG0 occasion, but cannot successfully decodes the CG-UCI, the network side device cannot know the first HARQ process ID of the first uplink data sent by the UE, then the network side device sends the feedback information.

Step 22: determining, according to the feedback information, an identifier of a first HARQ process corresponding to the first uplink data not successfully received by the network side device.

The terminal receives the feedback information sent by the network side device, and determines, according to the feedback information, the identifier of the first HARQ process corresponding to the feedback from the network side device. The feedback information is used for performing retransmission scheduling of the first uplink data.

Step 23: performing data retransmission according to the identifier of the first HARQ process, where the retransmission data includes the identifier of the first HARQ process.

The terminal retransmits the first uplink data, according to the feedback information, on the retransmission resource scheduled by the network side device, and carries the identifier of the first HARQ process in the first uplink data, where the identifier of the first HARQ process is a process identifier actually used when the terminal sends the first uplink data.

In this embodiment, when the terminal receives from the network side device the feedback information for the first uplink data, the terminal can determine according to the feedback information the identifier of the first HARQ process for sending the first uplink data, and perform data retransmission according to the identifier of the first HARQ process, so that the network side device can perform retransmission scheduling of uplink data in case that the network side device cannot successfully receive the identifier of the first HARQ process.

Optionally, the feedback information is used for scheduling retransmission of the first uplink data; or, the feedback information is used for indicating that the transmission of the first uplink data is unsuccessful. The feedback information may be a retransmission scheduling command sent by the network side device for the first uplink data, which is used for scheduling the retransmission of the first uplink data; or, the feedback information is a feedback on the transmission status of the first uplink data, indicating whether the first uplink data is successfully transmitted.

The initial transmission of the first HARQ process may be transmitted on the configured grant (CG) resource; or, the initial transmission of the first HARQ process may be transmitted on the dynamic grant (DG) resource.

Optionally, that the first uplink data is not successfully received by the network side device is caused by a target situation; the target situation includes at least one of following: listen before talk (LBT) failure; or a priority of an initial transmission of the first uplink data is lowered.

In this embodiment, the terminal may perform the initial transmission of the first uplink data on the CG resource or the DG resource; if an LBT failure occurs in the transmission resource of the initial transmission, and/or, the priority of the initial transmission of the first uplink data is lowered, the first uplink data may not be successfully received by the network side device.

Specifically, the initial transmission of the first HARQ process may be on the CG resource, that is, the terminal performs the initial transmission of the first uplink data on the CG resource, and the reason for the initial transmission failure of the first HARQ process may be that: the initial transmission of the first HARQ process is not successfully received by the network side device due to LBT failure or lowered priority. Alternatively, the initial transmission of the first HARQ process is on the DG resource, and the reason for the initial transmission failure of the first HARQ process may be that: the initial transmission of the first HARQ process is not successfully received by the network side device due to LBT failure.

After determining, according to the feedback information, the identifier of the first HARQ process corresponding to the first uplink data, the terminal performs data retransmission according to the identifier of the first HARQ process, and carries the identifier of the first HARQ process in the retransmitted data. Specifically, performing data retransmission according to the identifier of the first HARQ process may include: performing data retransmission, according to the identifier of the first HARQ process, on a resource indicated by the feedback information, where the feedback information includes: resource indication information for data retransmission; or, performing retransmission, according to the identifier of the first HARQ process, on a CG resource.

In this embodiment, when the terminal performs data retransmission according to the identifier of the first HARQ process, the terminal may perform the retransmission of the first uplink data on the indicated resource according to the resource indication information in the feedback information, where when the network side device sends the feedback information to the terminal, indication information for indicating retransmission resource is carried in the feedback information. Or, the terminal performs retransmission on the CG resource according to the identifier of the first HARQ process.

Further, that the terminal determines according to the feedback information the identifier of the first HARQ process corresponding to the first uplink data not successfully received by the network side device includes, but not limited to, the following manners.

Manner 1: The feedback information includes a time-based indication.

Specifically, the feedback information includes: the sending time of the first uplink data; the step 22 may include: determining a first HARQ process identifier corresponding to a sending time of the first uplink data, according to the sending time of the first uplink data.

In this embodiment, the feedback information includes the sending time of the first uplink data. When the network side device fails to receive the first uplink data, the network side device can obtain the sending time of the first uplink data, and carry the sending time in the feedback information and send the feedback information to the terminal, so that the terminal determines, according to the sending time, the HARQ process ID associated with the sending time, that is, the identifier of the first HARQ process, and further determines the CG resource or DG resource associated with the sending time.

Optionally, the step 23 includes: determining, according to the identifier of the first HARQ process, a CG resource or a DG resource corresponding to the identifier of the first HARQ process; performing the retransmission of the first uplink data on the determined CG resource or DG resource, where the terminal performs CG or DG retransmission associated with the first HARQ process according to the identifier of the first HARQ process, and carries the identifier of the first HARQ process in the retransmission data.

The following exemplarily illustrates the implementation process of the data retransmission performed by the terminal when the sending time of the first uplink data is carried in the feedback information.

Figure 3:
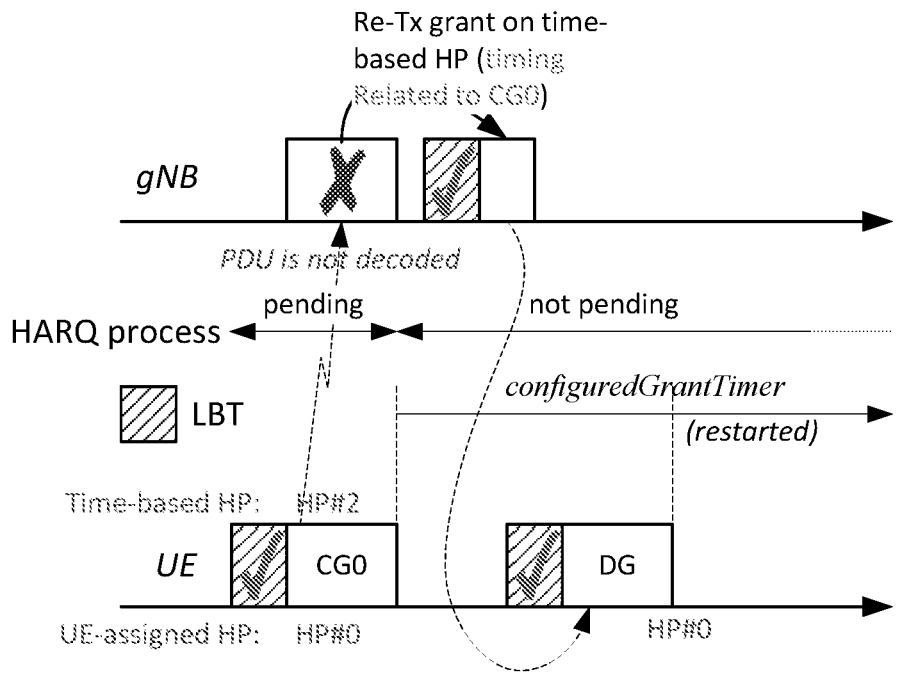
FIG. 3 is a schematic view of an implementation process of data retransmission according to an embodiment of the present disclosure.

Example 1 (as Shown in FIG. 3)

1): UE sends UL data (that is, the first uplink data) at CG0 occasion.

The UE selects an HARQ process in the HARQ process resource pool, it is assumed that the selected HARQ process has the first HARQ process ID (that is, the identifier of the first HARQ process), such as "HP #0" in FIG. 3, and carries the first HARQ process ID in the UL data. The UE carries the first HARQ process ID in the CG-UCI and multiplexes the CG-UCI into the UL data.

2): The network side device fails to receive the CG-UCI, and cannot know the first HARQ process ID corresponding to the UL data of the UE.

3): The network side device sends feedback information to the UE.

The sending time information of CG0 is carried by the network side device in the feedback information, where the feedback information may be a UL retransmission scheduling command, or a DL feedback command for the UL data. Optionally, the feedback information includes UL grant information.

4): The terminal receives the feedback information from the network side device and performs retransmission.

The terminal determines the CG resource information corresponding to the feedback information according to the sending time of the first uplink data in the feedback information. As shown in FIG. 3, the UE determines that the feedback information is the feedback information for the corresponding CG0.

5): The terminal performs retransmission according to the feedback information. According to step 1, it can be known that the retransmission data includes CG-UDI (uplink data information), and the first HARQ process ID.

Manner 2: The Feedback Information Includes a Second HARQ Process Identifier.

Specifically, the feedback information may include the second HARQ process identifier; the step 22 may include: determining a first HARQ process identifier corresponding to the second HARQ process identifier according to the second HARQ process identifier.

In this embodiment, the second HARQ process identifier is configured by the network side device, and may be calculated according to the sending time of the first uplink data, or is one special HARQ process identifier defined by the network side device. When the network side device fails to receive the first uplink data, the network side device sends feedback information to the terminal, the second HARQ process identifier being carried in the feedback information, and the network side device uses the second HARQ process identifier to perform the retransmission scheduling of the first uplink data.

After receiving the feedback information, the terminal can determine, according to the second HARQ process identifier in the feedback information, the identifier of the first HARQ process used for sending the first uplink data and corresponding to the second HARQ process identifier.

Specifically, the determining the identifier of the first HARQ process corresponding to the second HARQ process identifier according to the second HARQ process identifier includes: determining the sending time of the first uplink data according to the second HARQ process identifier; determining the identifier of the first HARQ process corresponding to the sending time of the first uplink data according to the sending time of the first uplink data. The terminal may determine the sending time of the first uplink data according to the second HARQ process identifier, and further determine, according to the sending time, the identifier of the first HARQ process corresponding to the sending time.

Optionally, the step 23 includes: determining, according to the identifier of the first HARQ process, a CG resource or a DG resource corresponding to the identifier of the first HARQ process; performing the first uplink data retransmission on the determined CG resource or DG resource. The terminal performs CG or DG retransmission associated with the first HARQ process according to the identifier of the first HARQ process, and carries the identifier of the first HARQ process in the retransmission data.

The following exemplarily illustrates the implementation process of the data retransmission performed by the terminal when the second HARQ process identifier is carried in the feedback information.

Figure 4:
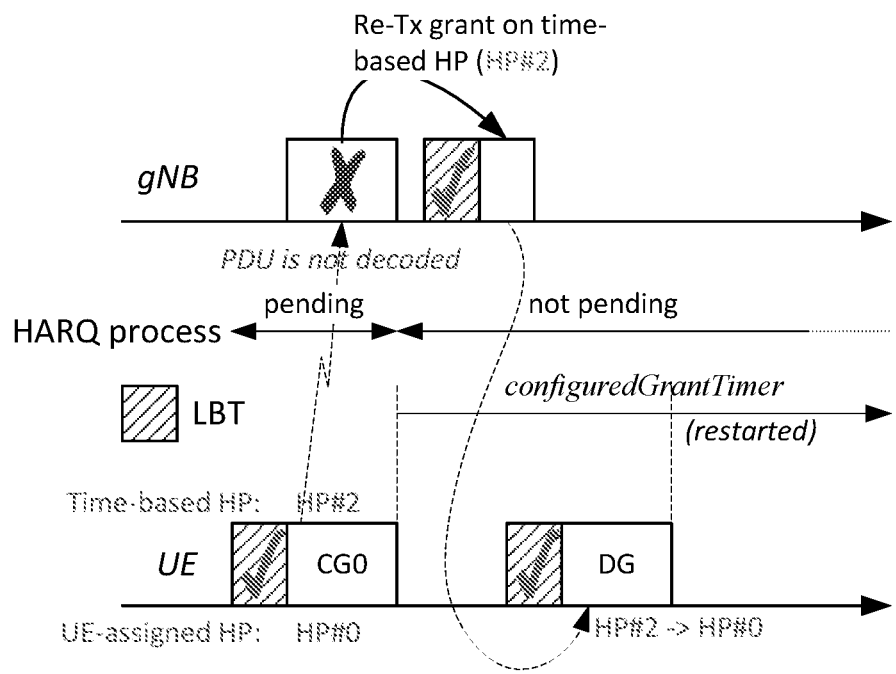
FIG. 4 is another schematic view of an implementation process of data retransmission according to an embodiment of the present disclosure.

Example 2 (as Shown in FIG. 4)

1): UE sends UL data at CG0 occasion.

The UE selects an HARQ process in the HARQ process resource pool, it is assumed that the selected HARQ process has the first HARQ process ID (that is, the identifier of the first HARQ process), such as "HP #0" in FIG. 4, and carries the first HARQ process ID in the UL data (that is, the first uplink data). The UE carries the first HARQ process ID in the CG-UCI and multiplexes the CG-UCI into the UL data.

2): The network side device fails to receive the CG-UCI, and cannot know the HARQ process ID of UL data of the UE.

3) The network side device sends feedback information to the UE.

The network side device calculates one HARQ process ID (that is, the second HARQ process identifier, such as HP #2 in FIG. 4) according to the sending time of CG0, and carries the HARQ process ID in the feedback information, where the feedback information may be a UL retransmission scheduling command, or a DL feedback command for the UL data. Optionally, the feedback indication includes UL grant information.

4): The terminal receives the feedback information from the network side device and performs retransmission.

The terminal inversely deduces the CG information corresponding to the feedback information, according to the information of the second HARQ process identifier in the feedback information, for example, based on the formula as follows:

HARQ Process ID=[floor(CURRENT_symbol/periodicity)]% nrof HARQ-Processes.

As shown in FIG. 4, the UE determines that the feedback information is the feedback information for the corresponding CG0.

5): The terminal device performs retransmission according to the feedback indication. According to step 1, it can be known that the retransmission data includes the CG-UDI and the first HARQ process ID.

It should be noted that the second HARQ process identifier may be indicated through target bit information in the feedback information; or, the second HARQ process identifier may be carried by an HARQ process identifier field in the feedback information.

For example, the network side device may introduce 1-bit information into the feedback information, to indicate whether the second HARQ process identifier is used. If the second HARQ process identifier is used, the terminal associates this retransmission scheduling with the initial transmission of the first uplink data on the CG, that is, this retransmission scheduling is a retransmission for the first uplink data. Or, the network side device populates an invalid HARQ process identifier (that is, the second HARQ process identifier), e.g., a process index not configured for the terminal, in the HARQ process identifier field of the feedback information.

Alternatively, the network side device uses 1-bit information to indicate whether the second HARQ process identifier is used, and uses a process identifier indication, the process identifier indication may be derived from the sending time of the first uplink data sent by the terminal. If such an indication is used, the terminal associates the retransmission scheduling with the uplink transmission at the time position corresponding to the process identifier indication.

Manner 3: The Feedback Information Includes the Index Information of the CG.

Specifically, the feedback information includes index information of a configured grant (CG); the step 22 may include: determining, according to the index information of the configured grant (CG), a CG resource for sending the first uplink data; and determining the identifier of the first HARQ process corresponding to the CG resource identifier according to the CG resource.

In this embodiment, the feedback information sent by the network side device includes the index information of the CG, for example: CG ID. After receiving the feedback information, the terminal determines, according to the index information of the CG, the CG resource and the identifier of the first HARQ process corresponding to the CG resource. Optionally, the network side device may determine the index information of the configured grant (CG) according to the time domain position where the network side device fails to receive the identifier of the first HARQ process.

The following exemplarily illustrates the implementation process of the data retransmission performed by the terminal when the index information of the CG is carried in the feedback information.

Figure 5:
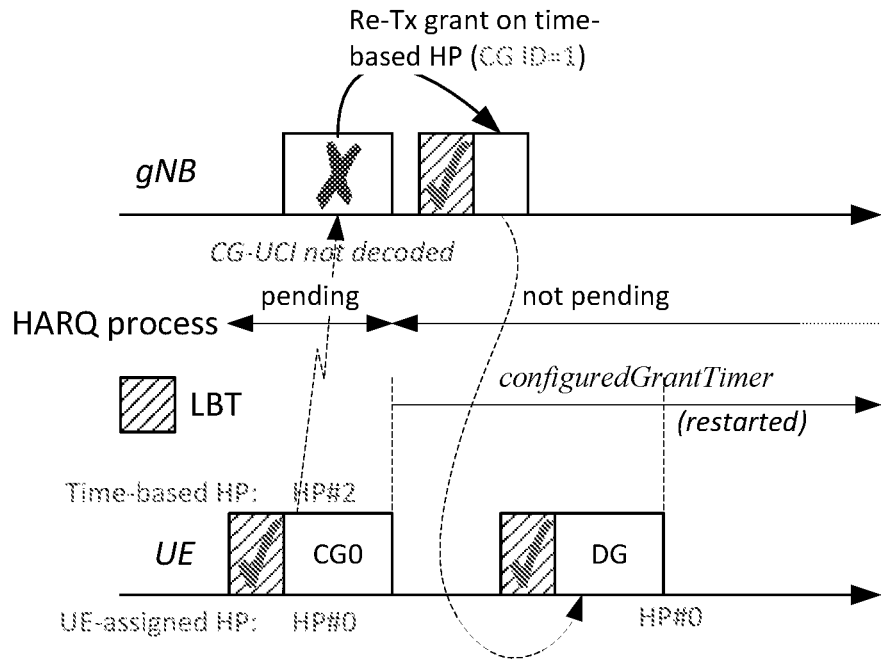
FIG. 5 is still another schematic view of an implementation process of data retransmission according to an embodiment of the present disclosure.

Example 3 (as Shown in FIG. 5)

1): UE sends UL data at the CG0 occasion.

UE selects an HARQ process in the HARQ process resource pool, it is assumed that the selected HARQ process has the first HARQ process ID (that is, the identifier of the first HARQ process), such as "HP #0" shown in FIG. 5, and carries the first HARQ process ID in the UL data (that is, the first uplink data). The UE carries the first HARQ process ID in the CG-UCI and multiplexes the CG-UCI into the UL data.

2): The network side device fails to receive the CG-UCI, and cannot know the HARQ process ID of UL data of the UE.

3): The network side device sends feedback information to the UE.

The network side device determines the configured grant ID information (that is, the index information) of the configured grant according to the time domain position information of the configured grant where the network side device fails to receive the uplink data, and carries the configured grant ID of CG0 (taking FIG. 5 as an example, the CG ID is 1) in the feedback information, where the feedback information may be a UL retransmission scheduling command, or a DL feedback command for UL data. Optionally, the feedback indication includes UL grant information.

4): The terminal receives the feedback information from the network side device, and performs the retransmission.

The terminal determines the CG information corresponding to the feedback information according to the index information of CG in the feedback information. As shown in FIG. 5, the UE determines that the feedback information is the feedback information corresponding to CG0.

5): The terminal device performs retransmission according to the feedback indication. According to step 1, it can be known that the retransmission data includes the CG-UDI and the first HARQ process ID.

Optionally, the feedback information may include: a new data indicator NDI, and/or a redundancy version identifier (RV ID). The feedback information is scrambled by a configured scheduling RNTI (CS-RNTI).

Optionally, when the network side device cannot parse out the first uplink data, but can determine the identifier of the first HARQ process used by the first uplink data, the network side device uses the identifier of the first HARQ process to perform retransmission scheduling.

In the embodiment of the present disclosure, when the terminal receives the feedback information for the first uplink data from the network side device, the terminal can determine according to the feedback information the identifier of the first HARQ process for sending the first uplink data, and perform data retransmission according to the identifier of the first HARQ process, so that the network side device can also perform the retransmission scheduling of the uplink data in case that the identifier of the first HARQ process cannot be successfully received.

Figure 6:
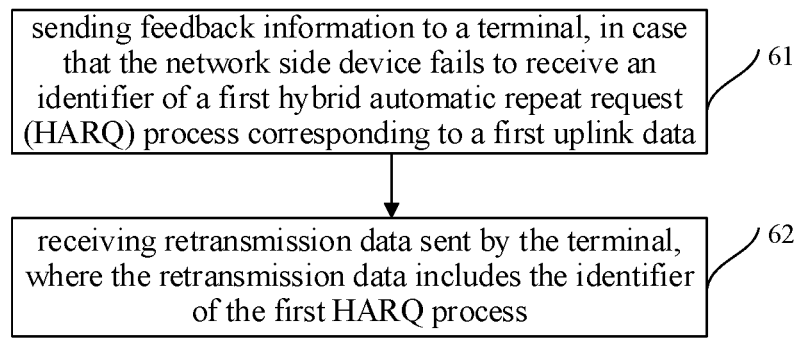
FIG. 6 is another flowchart of an information transmission method according to an embodiment of the present disclosure.

As shown in FIG. 6, an embodiment of the present disclosure further provides an information transmission method, which is performed by a network side device, and includes the following steps 61 and 62.

Step 61: sending feedback information to a terminal in case that the network side device fails to receive an identifier of a first hybrid automatic repeat request (HARQ) process corresponding to a first uplink data.

If the network side device cannot successfully receive the first uplink data sent by the terminal, the network side device sends the feedback information to the terminal. The failure to successfully receive the first uplink data may be that: the network side device cannot parse out the identifier of the first HARQ process carried in the first uplink data.

For example: UE sends UL data at CG0 occasion: UE selects an HARQ process in the HARQ process resource pool, it is assumed that the selected HARQ process has the first HARQ process ID (that is, the identifier of the first HARQ process), and carries the first HARQ process ID in the first uplink data. The UE carries the first HARQ process ID in the CG-UCI and multiplexes the CG-UCI into the UL data. When the network side device only detects that the UE sends data at CG0 occasion, but does not successfully decode the CG-UCI, and cannot know the first HARQ process ID of the first uplink data sent by the UE, then the network side device sends the feedback information.

Step 62: receiving retransmission data sent by the terminal, where the retransmission data includes the identifier of the first HARQ process.

After receiving the feedback information, the terminal determines, according to the feedback information, the identifier of the first HARQ process corresponding to the feedback of the network side device. The feedback information is used for performing retransmission scheduling of the first uplink data. The terminal retransmits the first uplink data, according to the feedback information, on the retransmission resource scheduled by the network side device, and carries the identifier of the first HARQ process in the first uplink data. The network side device may obtain the identifier of the first HARQ process after receiving the retransmitted data.

In this embodiment, in case that the network side device cannot successfully receive the identifier of the first HARQ process, the network side device sends feedback information for the first uplink data to the terminal, so that the terminal can determine according to the feedback information the identifier of the first HARQ process for sending the first uplink data, and perform data retransmission according to the identifier of the first HARQ process, thereby enabling the network side device to perform the retransmission scheduling of the uplink data in case that the identifier of the first HARQ process cannot be successfully received.

Optionally, the feedback information is used for scheduling the retransmission of the first uplink data; or, the feedback information is used for indicating that the transmission of the first uplink data is unsuccessful. The feedback information may be a retransmission scheduling command sent by the network side device for the first uplink data, which is used for scheduling the retransmission of the first uplink data; or, the feedback information is a feedback on the transmission status of the first uplink data, indicating whether the first uplink data is successfully transmitted.

Optionally, the initial transmission of the first HARQ process is transmitted on the configured grant (CG) resource; or the initial transmission of the first HARQ process is transmitted on the dynamical grant (DG) resource. A target situation may cause the network side device to fail to receive the first uplink data, that is, fail to receive the identifier of the first HARQ process. The target situation may include, but not limited to, at least one of following: listen before talk (LBT) failure, that is, LBT failure occurs on the transmission resource of the initial transmission; or a priority of an initial transmission of the first uplink data is lowered.

Specifically, the initial transmission of the first HARQ process may be on the CG resource, that is, the terminal performs the initial transmission of the first uplink data on the CG resource, and the reason for the initial transmission failure of the first HARQ process may be that: the network side device fails to receive the initial transmission of the first HARQ process successfully due to LBT failure or lowered priority. Alternatively, the initial transmission of the first HARQ process is on the DG resource, and the reason for the initial transmission failure of the first HARQ process may be that: the network side device fails to receive the initial transmission of the first HARQ process successfully due to LBT failure.

Optionally, the receiving retransmission data sent by the terminal includes: receiving retransmission data on resource indicated by the feedback information, where the feedback information includes resource indication information for data retransmission; and receiving retransmission data sent by the terminal on a CG resource.

In this embodiment, when the network side device sends the feedback information to the terminal, indication information for indicating retransmission resource can be carried in the feedback information, and the terminal performs the retransmission of the first uplink data on the indicated resource according to the resource indication information in the feedback information, and the network side device receives the retransmitted data on the indicated resource. Alternatively, the terminal performs retransmission on the CG resource according to the identifier of the first HARQ process, and the network side device receives the retransmission data on the CG resource.

Optionally, the feedback information includes: sending time of the first uplink data. The terminal can determine the identifier of the first HARQ process according to the sending time of the first uplink data.

In this embodiment, when the network side device fails to receive the identifier of the first HARQ process corresponding to the first uplink data, the network side device can obtain the sending time of the first uplink data, and carry the sending time in the feedback information and send the feedback information to the terminal, so that the terminal determines, according to the sending time, the identifier of the first HARQ process associated with the sending time, and further determines the CG resource or DG resource associated with the sending time. The identifier of the first HARQ process is the HARQ process identifier actually used when the terminal sends the first uplink data.

Optionally, the feedback information includes: a second HARQ process identifier. The terminal may determine the identifier of the first HARQ process according to the second HARQ process identifier.

In this embodiment, the second HARQ process identifier is configured by the network side device, and the network side device can calculate the second HARQ process identifier according to the sending time of the first uplink data, or the network side device defines one special HARQ process identifier. When the identifier of the first HARQ process corresponding to the first uplink data is not successfully received, the network side device sends the feedback information to the terminal, the second HARQ process identifier being carried in the feedback information, and performs the retransmission scheduling of the first uplink data by using the second HARQ process identifier.

Specifically, in case that the identifier of the first HARQ process corresponding to the first uplink data fails to be received, prior to the sending the feedback information to the terminal, the method may further include: determining the second HARQ process identifier according to the sending time of the first uplink data. After receiving the feedback information, the terminal can determine, according to the second HARQ process identifier in the feedback information, the identifier of the first HARQ process used for sending the first uplink data and corresponding to the second HARQ process identifier. Specifically, the terminal may determine the sending time of the first uplink data according to the second HARQ process identifier; and determine, according to the sending time of the first uplink data, the identifier of the first HARQ process corresponding to the sending time of the first uplink data; and further obtain, according to the identifier of the first HARQ process, the CG resource or the DG resource for sending the first uplink data.

Optionally, the second HARQ process identifier is indicated through target bit information in the feedback information; or, the second HARQ process identifier is carried by an HARQ process identifier field in the feedback information.

For example, the network side device may introduce 1-bit information into the feedback information to indicate whether the second HARQ process identifier is used, and if the second HARQ process identifier is used, the terminal associates this retransmission scheduling with the initial transmission of the first uplink data on the CG, or, the network side device populates an invalid HARQ process identifier (that is, the second HARQ process identifier), e.g., a process index not configured for the terminal, in the HARQ process identifier field of the feedback information.

Alternatively, the network side device uses 1-bit information to indicate whether the second HARQ process identifier is used, and uses a process identifier indication, the process identifier indication may be derived from the sending time of the first uplink data sent by the terminal. If such an indication is used, the terminal associates the retransmission scheduling with the uplink transmission at the time position corresponding to the process identifier indication.

Optionally, the feedback information includes: index information of a configured grant (CG). The terminal can determine, according to the index information of CG, a CG resource for sending the first uplink data, so as to determine according to the CG resource the identifier of the first HARQ process corresponding to the CG resource.

In this embodiment, the feedback information sent by the network side device includes index information of the CG, for example: CG ID. Optionally, in case that the identifier of the first HARQ process corresponding to the first uplink data fails to be received, prior to the sending the feedback information to the terminal, the method further includes: determining the index information of the configured grant (CG) according to the time domain position where the network side device fails to receive the identifier of the first HARQ process. After receiving the feedback information, the terminal determines, according to the index information of the CG, the CG resource and the identifier of the first HARQ process corresponding to the CG resource.

Optionally, the feedback information includes: a new data indicator (NDI), and/or a redundancy version identifier (RV ID). The feedback information is scrambled by CS-RNTI.

Optionally, when the network side device cannot parse out the first uplink data, but can determine the identifier of the first HARQ process used by the first uplink data, the network side device uses the identifier of the first HARQ process to perform retransmission scheduling.

In this embodiment, in case that the network side device cannot successfully receive the identifier of the first HARQ process, the network side device sends feedback information for the first uplink data to the terminal, so that the terminal can determine, according to the feedback information, the identifier of the first HARQ process for sending the first uplink data, and perform data retransmission according to the identifier of the first HARQ process, thereby enabling the network side device to perform retransmission scheduling of the uplink data in case that the network side device cannot successfully receive the identifier of the first HARQ process.

Figure 7:
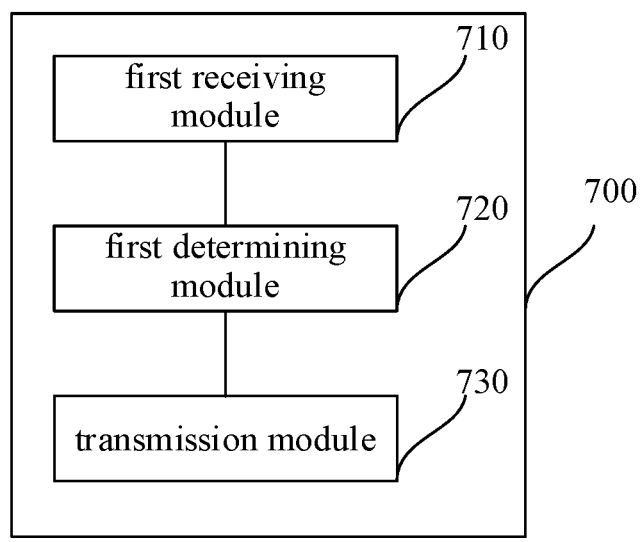
FIG. 7 is a schematic view of module structure of a terminal according to an embodiment of the present disclosure.

As shown in FIG. 7, an embodiment of the present disclosure provides a terminal 700, including:
- a first receiving module 710, configured to receive, from a network side device, feedback information for a first uplink data;
- a first determining module 720, configured to determine, according to the feedback information, a first hybrid automatic repeat request (HARQ) process identifier corresponding to the first uplink data not successfully received by the network side device; and
- a transmission module 730, configured to perform data retransmission according to the identifier of the first HARQ process,
where the retransmission data includes the identifier of the first HARQ process.

Optionally, the feedback information is used for scheduling retransmission of the first uplink data;
or,
the feedback information is used for indicating that transmission of the first uplink data is unsuccessful.

Optionally, an initial transmission of the first HARQ process is transmitted on a configured grant (CG) resource; or
the initial transmission of the first HARQ process is transmitted on a dynamic grant (DG) resource.

Optionally, the transmission module is specifically configured to:
perform data retransmission, according to the identifier of the first HARQ process, on a resource indicated by the feedback information, where the feedback information includes resource indication information for data retransmission; or
perform retransmission, according to the identifier of the first HARQ process, on a CG resource.

Optionally, the feedback information includes a sending time of the first uplink data;
the first determining module is specifically configured to:
determine, according to the sending time of the first uplink data, the identifier of the first HARQ process corresponding to the sending time of the first uplink data.

Optionally, the feedback information includes a second HARQ process identifier;
the first determining module is specifically configured to:
determine, according to the second HARQ process identifier, the identifier of the first HARQ process corresponding to the second HARQ process identifier.

Optionally, the first determining module is specifically configured to:
determine a sending time of the first uplink data according to the second HARQ process identifier;
determine, according to the sending time of the first uplink data, a first HARQ process identifier corresponding to the sending time of the first uplink data.

Optionally, the transmission module is specifically configured to:
determine a CG resource or a DG resource corresponding to the identifier of the first HARQ process according to the identifier of the first HARQ process;
perform retransmission of the first uplink data on the determined CG resource or DG resource.

Optionally, the second HARQ process identifier is indicated by target bit information in the feedback information; or
the second HARQ process identifier is carried by an HARQ process identifier field in the feedback information.

Optionally, the feedback information includes index information of a configured grant (CG);
the first determining module is specifically configured to:
determine the CG resource for sending the first uplink data, according to the index information of the configured grant (CG);
determine, according to the CG resource, a first HARQ process identifier corresponding to the CG resource.

Optionally, the feedback information includes: a new data indicator (NDI), and/or a redundancy version identifier (RV ID).

Optionally, that the first uplink data is not successfully received by the network side device is caused by a target situation;
the target situation includes at least one of following:
listen before talk (LBT) failure; or
a priority of an initial transmission of the first uplink data is lowered.

It should be noted that the embodiment of the terminal corresponds to the above-mentioned embodiment of the information transmission method performed by the terminal, and all the implementation methods in the above-mentioned method embodiment are applicable to the embodiments of the terminal, and can also achieve the same technical effect. Since the embodiment of the method and the embodiment of the terminal are conceived based on the same concept, and the principle of solving the problem is similar, references may be made to each other, and the repetition will not be repeated.

Figure 8:
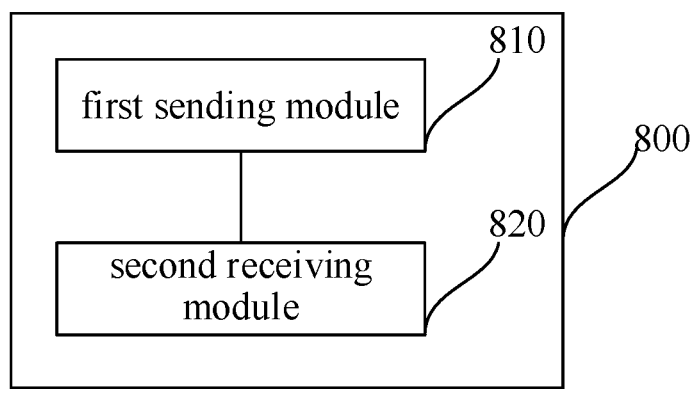
FIG. 8 is a schematic view of module structure of a network side device according to an embodiment of the present disclosure.

As shown in FIG. 8, an embodiment of the present disclosure provides a network side device 800, including:
- a first sending module 810, configured to send feedback information to a terminal in case that the network side device fails to receive an identifier of a first hybrid automatic repeat request (HARQ) process corresponding to a first uplink data; and
- a second receiving module 820, configured to receive retransmission data sent by the terminal, where the retransmission data includes the identifier of the first HARQ process.

Optionally, the feedback information is used for scheduling retransmission of the first uplink data;
or,
the feedback information is used for indicating that the transmission of the first uplink data is unsuccessful.

Optionally, an initial transmission of the first HARQ process is transmitted on a configured grant (CG) resource; or
the initial transmission of the first HARQ process is transmitted on a dynamic grant (DG) resource.

Optionally, the second receiving module is specifically configured to:
receive retransmission data on a resource indicated by the feedback information, where the feedback information includes resource indication information for data retransmission; or,
receive the retransmission data sent by the terminal on a CG resource.

Optionally, the feedback information includes: a sending time of the first uplink data.

Optionally, the feedback information includes: a second HARQ process identifier.

Optionally, the network side device also includes:
a second determining module, configured to determine the second HARQ process identifier according to the sending time of the first uplink data.

Optionally, the second HARQ process identifier is indicated by target bit information in the feedback information; or
the second HARQ process identifier is carried by an HARQ process identifier field in the feedback information.

Optionally, the feedback information includes: index information of a configured grant (CG).

Optionally, the network side device further includes:
a third determining module, configured to determine the index information of the configured grant (CG) according to a time domain position where the network side device fails to receive the identifier of the first HARQ process.

Optionally, the feedback information includes: a new data indicator (NDI), and/or a redundancy version identifier (RV ID).

It should be noted that the embodiment of the network side device corresponds to the above-mentioned embodiment of the information transmission method performed by the network side device, and all the implementation methods in the above-mentioned method embodiment are applicable to the embodiments of the network side device, and can also achieve the same technical effect.

It should be noted that the division of units in the embodiments of the present disclosure is illustrative, and is only a logical function division, and there may be another division method in actual implementation. In addition, the functional units in various embodiments of the present disclosure may be integrated into one processing unit, or each unit may exist separately physically, or two or more units may be integrated into one unit. The above-mentioned integrated units can be implemented in the form of hardware or in the form of software functional units.

If the integrated unit is implemented in the form of a software function unit and sold or used as an independent product, it can be stored in a processor-readable storage medium. Based on such an understanding, essential parts, or parts contributing to the related art, of the technical solution of the present disclosure, or all or a part of the technical solution may be implemented in a form of a software product. The computer software product is stored in a storage medium, and includes several instructions to enable a computer device (which may be a personal computer, a server, or a network device, etc.) or a processor to execute all or part of the steps of the methods described in the various embodiments of the present disclosure. The aforementioned storage media include: a universal serial bus (USB) flash drive, removable hard disk, read-only memory (ROM), random access memory (RAM), magnetic disk, optical disc or other media that can store program codes.

Figure 9:
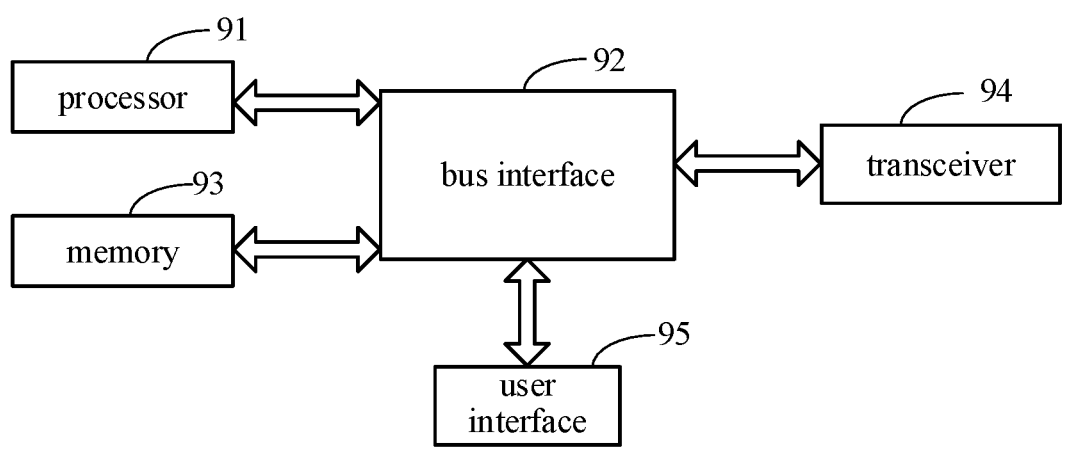
FIG. 9 is a block diagram of a terminal according to an embodiment of the present disclosure.

As shown in FIG. 9, an embodiment of the present disclosure further provides a terminal, including: a transceiver 94, a memory 93, a processor 91, and a computer program stored in the memory 93 and configured to be executed by the processor, where the memory 93 is used for storing computer program; the transceiver 94 is connected to the bus interface 92 and is used for sending and receiving data under the control of the processor 91; and the processor 91 is used for reading the computer program in the memory 93 and performing following operations:
receiving, from a network side device, feedback information for a first uplink data;
determining, according to the feedback information, an identifier of a first hybrid automatic repeat request (HARQ) process corresponding to the first uplink data not successfully received by the network side device; and
performing data retransmission according to the identifier of the first HARQ process,
where the retransmission data includes the identifier of the first HARQ process.

Optionally, the feedback information is used for scheduling retransmission of the first uplink data;
or,
the feedback information is used for indicating that transmission of the first uplink data is unsuccessful.

Optionally, an initial transmission of the first HARQ process is transmitted on a configured grant (CG) resource; or
the initial transmission of the first HARQ process is transmitted on a dynamic grant (DG) resource.

Optionally, the performing data retransmission according to the identifier of the first HARQ process specifically includes:
performing data retransmission, according to the identifier of the first HARQ process, on a resource indicated by the feedback information, where the feedback information includes resource indication information for data retransmission; or performing retransmission, according to the identifier of the first HARQ process, on a CG resource.

Optionally, the feedback information includes a sending time of the first uplink data;

the determining, according to the feedback information, the identifier of the first HARQ process corresponding to the first uplink data not successfully received by the network side device specifically includes:

determining, according to the sending time of the first uplink data, the identifier of the first HARQ process corresponding to the sending time of the first uplink data.

Optionally, the feedback information includes a second HARQ process identifier;

the determining, according to the feedback information, the identifier of the first HARQ process corresponding to the first uplink data not successfully received by the network side device includes:

determining, according to the second HARQ process identifier, the identifier of the first HARQ process corresponding to the second HARQ process identifier.

Optionally, the determining, according to the second HARQ process identifier, the identifier of the first HARQ process corresponding to the second HARQ process identifier specifically includes:

determining the sending time of the first uplink data according to the second HARQ process identifier;

determining, according to the sending time of the first uplink data, the identifier of the first HARQ process corresponding to the sending time of the first uplink data.

Optionally, the performing data retransmission according to the identifier of the first HARQ process specifically includes:

determining, according to the identifier of the first HARQ process, a CG resource or a DG resource corresponding to the identifier of the first HARQ process;

performing retransmission of the first uplink data on the determined CG resource or DG resource.

Optionally, the second HARQ process identifier is indicated by target bit information in the feedback information; or the second HARQ process identifier is carried by an HARQ process identifier field in the feedback information.

Optionally, the feedback information includes index information of a configured grant (CG);

the determining, according to the feedback information, the identifier of the first HARQ process corresponding to the first uplink data not successfully received by the network side device specifically includes:

determining, according to the index information of the CG, a CG resource used for sending the first uplink data;

determining, according to the CG resource, the identifier of the first HARQ process corresponding to the CG resource.

Optionally, the feedback information includes: a new data indicator (NDI), and/or a redundancy version identifier (RV ID).

Optionally, that the first uplink data is not successfully received by the network side device is caused by a target situation;

the target situation includes at least one of following:

listen before talk (LBT) failure; or a priority of an initial transmission of the first uplink data is lowered.

It should be noted that, in FIG. 9, the bus architecture may include any number of interconnected buses and bridges, and connects various circuits such as one or more processors represented by the processor 91 and the memory represented by the memory 93 together. The bus architecture can also link together various other circuits such as peripherals, voltage regulators, and power management circuits, etc., which are well known in the art and therefore will not be further described herein. The bus interface provides the interface. Transceiver 94 may be a plurality of elements, i.e., including a transmitter and a transceiver, which provides units for communicating with various other devices over transmission media, these transmission media include wireless channel, wired channel, fiber optic cable, and other transmission media. For different terminals, the user interface 95 may also be an interface capable of connecting externally and internally required devices, and the connected devices include but not limited to a keypad, monitor, speaker, microphone, joystick, and the like. The processor 91 is responsible for managing the bus architecture and general processing, and the memory 93 can store data used by the processor 91 when performing operations.

Optionally, the processor 91 may be a central processing unit (CPU), application specific integrated circuit (ASIC), field-programmable gate array (FPGA) or complex programmable logic device (CPLD), and the processor can also adopt a multi-core architecture.

The processor is used to perform any one of the methods provided in the embodiments of the present disclosure according to the obtained executable instructions by calling the computer program stored in the memory. The processor and memory may also be physically arranged separately.

It should be noted here that the above-mentioned terminal provided by the embodiments of the present disclosure can implement all the method steps implemented by the above-mentioned embodiment of the method performed by the terminal, and can achieve the same technical effect. Parts and beneficial effects in this embodiment that are the same as those in the method embodiment will not be described in detail here.

Figure 10:
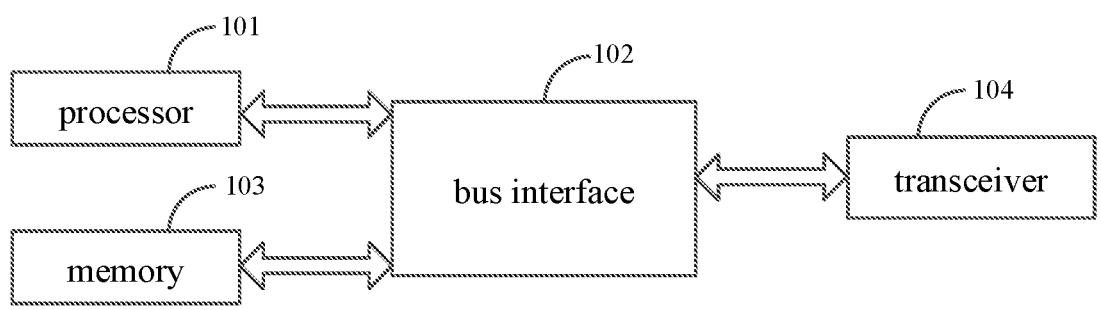
FIG. 10 is a block diagram of a network side device according to an embodiment of the present disclosure.

As shown in FIG. 10, an embodiment of the present disclosure further provides a network side device, including: a transceiver 104, a memory 103, a processor 101, and a computer program stored in the memory 103 and configured to be executed by the processor, where the memory 103 is used for storing computer program; the transceiver 104 is connected to the bus interface 102 and is used for sending and receiving data under the control of the processor 101; and the processor 101 is used for reading the computer program in the memory 103 and performing following operations:

sending feedback information to a terminal in case that the network side device fails to receive an identifier of a first hybrid automatic repeat request (HARQ) process corresponding to a first uplink data;

receiving retransmission data sent by the terminal, where the retransmission data includes the identifier of the first HARQ process.

Optionally, the feedback information is used for scheduling retransmission of the first uplink data;

or, the feedback information is used for indicating that the transmission of the first uplink data is unsuccessful.

Optionally, an initial transmission of the first HARQ process is transmitted on a configured grant (CG) resource; or the initial transmission of the first HARQ process is transmitted on a dynamic grant (DG) resource.

Optionally, the receiving retransmission data sent by the terminal specifically includes:

receiving retransmission data on resource indicated by the feedback information, where the feedback information includes: resource indication information for data retransmission; or, receiving retransmission data sent by the terminal on a CG resource.

Optionally, the feedback information includes: a sending time of the first uplink data.

Optionally, the feedback information includes: a second HARQ process identifier.

Optionally, the processor is further used for:

determining a second HARQ process identifier according to the sending time of the first uplink data.

Optionally, the second HARQ process identifier is indicated by target bit information in the feedback information; or the second HARQ process identifier is carried by an HARQ process identifier field in the feedback information.

Optionally, the feedback information includes: index information of a configured grant (CG).

Optionally, the processor is further used for:

determining the index information of the configured grant (CG) according to a time domain position where the network side device fails to receive the identifier of the first HARQ process.

Optionally, the feedback information includes: a new data indicator (NDI), and/or a redundancy version identifier (RV ID).

It should be noted that, in FIG. 10, the bus architecture may include any number of interconnected buses and bridges, and connects various circuits such as one or more processors represented by the processor 101 and the memory represented by the memory 103 together. The bus architecture can also link together various other circuits such as peripherals, voltage regulators, and power management circuits, etc., which are well known in the art and therefore will not be further described herein. The bus interface provides the interface. Transceiver 104 may be a plurality of elements, i.e., including a transmitter and a transceiver, which provides units for communicating with various other devices over transmission media, these transmission media include wireless channel, wired channel, fiber optic cable, and other transmission media.

The processor 101 is responsible for managing the bus architecture and general processing, and the memory 103 can store data used by the processor 101 when performing operations.

The processor 101 may be a central processing unit (CPU), application specific integrated circuit (ASIC), field-programmable gate array (FPGA) or complex programmable logic device (CPLD), and the processor can also adopt a multi-core architecture.

It should be noted here that the above-mentioned network side device provided by the embodiments of the present disclosure can implement all the method steps implemented by the above-mentioned embodiment of the method performed by the network side device, and can achieve the same technical effect. Parts and beneficial effects in this embodiment that are the same as those in the method embodiment will not be described in detail here.

In addition, a specific embodiment of the present disclosure further provides a computer-readable storage medium storing thereon a computer program, where when the program is executed by a processor, the steps in the above-mentioned information transmission method are implemented, and the same technical effect can be achieved, in order to avoid repetition, no more details is provided here. The readable storage medium may be any available medium or data storage device that can be accessed by the processor, including but not limited to magnetic storage (such as floppy disk, hard disk, magnetic tape, magneto-optical disk (MO)), optical storage (such as compact disc (CD), digital versatile disc (DVD), blue light disc (BD), holographic versatile disc (HVD)), and semiconductor memory (such as ROM, erasable programmable ROM (EPROM), electrically erasable programmable ROM (EEPROM), non-volatile memory (NAND FLASH), solid-state drive (SSD)), etc.

In addition, it should be pointed out that, in the apparatus and method of the present disclosure, obviously, various components or steps can be decomposed and/or recombined. These decompositions and/or recombinations should be considered as equivalent solutions of the present disclosure. Also, the steps for performing the above series of processes can naturally be performed in chronological order according to the illustrated order, but they are not necessarily performed in chronological order, and some steps can be performed in parallel or independently of each other. For those of ordinary skill in the art, it can be understood that all or any steps or components of the methods and apparatuses of the present disclosure can be implemented in any computing apparatuses (including processors, storage media, etc.) or networks of computing apparatuses in the form of hardware, firmware, software or a combination thereof, which can be implemented by those skilled in the art by using their basic programming skills after reading the description of the present disclosure.

Therefore, the object of the present disclosure can also be achieved by running a program or a group of programs on any computing apparatus. The computing device may be a well-known general-purpose apparatus. Therefore, the object of the present disclosure can also be achieved by merely providing a program product including program codes for implementing the method or apparatus. That is, such a program product also constitutes the subject matter of the present disclosure, and a storage medium storing such a program product also constitutes the subject matter of the present disclosure. Obviously, the storage medium may be any well-known storage medium or any storage medium developed in the future. It should also be pointed out that, in the apparatus and method of the present disclosure, obviously, various components or steps can be decomposed and/or recombined. These decompositions and/or recombinations should be considered as equivalent solutions of the present disclosure. Also, the steps for performing the above series of processes can naturally be performed in chronological order according to the illustrated order, but they are not necessarily performed in chronological order, and some steps can be performed in parallel or independently of each other.

Obviously, those skilled in the art can make various changes and modifications to the present disclosure without departing from the spirit and scope of the present disclosure. In this way, if these changes and modifications of the present disclosure fall within the scope of the claims of the present

What is claimed is:

1. An information transmission method, performed by a terminal, comprising:
   receiving, from a network side device, feedback information for a first uplink data;
   determining, according to the feedback information, an identifier of a first hybrid automatic repeat request (HARQ) process corresponding to the first uplink data not successfully received by the network side device; and
   performing data retransmission according to the identifier of the first HARQ process,
   wherein the feedback information does not indicate the identifier of the first HARQ process, and the feedback information is used for scheduling retransmission of the first uplink data, or, the feedback information is used for indicating that transmission of the first uplink data is unsuccessful;
   wherein the retransmission data comprises the identifier of the first HARQ process;
   wherein the feedback information comprises a sending time of the first uplink data;
   the determining, according to the feedback information, the identifier of the first HARQ process corresponding to the first uplink data not successfully received by the network side device comprises:
   determining, according to the sending time of the first uplink data, the identifier of the first HARQ process corresponding to the sending time of the first uplink data;
   or,
   wherein the feedback information comprises a second HARQ process identifier;
   the determining, according to the feedback information, the identifier of the first HARQ process corresponding to the first uplink data not successfully received by the network side device comprises:
   determining, according to the second HARQ process identifier, the identifier of the first HARQ process corresponding to the second HARQ process identifier;
   or,
   wherein the feedback information comprises index information of a configured grant (CG);
   the determining, according to the feedback information, the identifier of the first HARQ process corresponding to the first uplink data not successfully received by the network side device comprises:
   determining, according to the index information of the CG, a CG resource used for sending the first uplink data; and
   determining, according to the CG resource, the identifier of the first HARQ process corresponding to the CG resource.

2. The information transmission method according to claim 1,
   wherein an initial transmission of the first HARQ process is transmitted on a configured grant (CG) resource; or the initial transmission of the first HARQ process is transmitted on a dynamic grant (DG) resource.

3. The information transmission method according to claim 1, wherein the performing data retransmission according to the identifier of the first HARQ process comprises:
   performing data retransmission, according to the identifier of the first HARQ process, on a resource indicated by the feedback information, wherein the feedback information comprises resource indication information for data retransmission; or
   performing retransmission on a CG resource according to the identifier of the first HARQ process.

4. The information transmission method according to claim 1, wherein the determining, according to the second HARQ process identifier, the identifier of the first HARQ process corresponding to the second HARQ process identifier comprises:
   determining the sending time of the first uplink data according to the second HARQ process identifier; and
   determining, according to the sending time of the first uplink data, the identifier of the first HARQ process corresponding to the sending time of the first uplink data.

5. The information transmission method according to claim 1, wherein, in case that the feedback information comprises the sending time of the first uplink data or the second HARQ process identifier, the performing data retransmission according to the identifier of the first HARQ process comprises:
   determining, according to the identifier of the first HARQ process, a CG resource or a DG resource corresponding to the identifier of the first HARQ process; and
   performing retransmission of the first uplink data on the determined CG resource or DG resource.

6. The information transmission method according to claim 1, wherein the second HARQ process identifier is indicated by target bit information in the feedback information; or
   the second HARQ process identifier is carried by an HARQ process identifier field in the feedback information.

7. The information transmission method according to claim 1, wherein the feedback information comprises: a new data indicator, and/or a redundancy version identifier;
   and/or,
   wherein that the first uplink data is not successfully received by the network side device is caused by a target situation;
   the target situation comprises at least one of following:
   listen before talk (LBT) failure; or
   a priority of an initial transmission of the first uplink data is lowered.

8. An information transmission method, performed by a network side device, comprising:
   sending feedback information to a terminal in case that the network side device fails to receive an identifier of a first hybrid automatic repeat request (HARQ) process corresponding to a first uplink data;
   receiving retransmission data sent by the terminal, wherein the retransmission data comprises the identifier of the first HARQ process;
   wherein the feedback information does not indicate the identifier of the first HARQ process, and the feedback information is used for scheduling retransmission of the first uplink data, or, the feedback information is used for indicating that transmission of the first uplink data is unsuccessful;
   wherein the feedback information comprises a sending time of the first uplink data;
   or,
   wherein the feedback information comprises a second HARQ process identifier;
   or,
   wherein the feedback information comprises index information of a configured grant (CG).

9. The information transmission method according to claim 8,
wherein an initial transmission of the first HARQ process is transmitted on a configured grant (CG) resource; or the initial transmission of the first HARQ process is transmitted on a dynamic grant (DG) resource.

10. The information transmission method according to claim 8, wherein the receiving retransmission data sent by the terminal comprises:
receiving retransmission data on a resource indicated by the feedback information, wherein the feedback information comprises resource indication information for data retransmission; or,
receiving retransmission data sent by the terminal on a CG resource.

11. The information transmission method according to claim 8, wherein in case that the feedback information comprises the second HARQ process identifier and the network side device fails to receive the identifier of the first HARQ process corresponding to the first uplink data, prior to sending the feedback information to the terminal, the method further comprises:
determining the second HARQ process identifier according to the sending time of the first uplink data.

12. The information transmission method according to claim 8, wherein the second HARQ process identifier is indicated by target bit information in the feedback information; or
the second HARQ process identifier is carried by an HARQ process identifier field in the feedback information.

13. The information transmission method according to claim 8, wherein in case that the feedback information comprises the index information of the CG and the network side device fails to receive the identifier of the first HARQ process corresponding to the first uplink data, prior to sending the feedback information to the terminal, the method further comprises:
determining the index information of the CG according to a time domain position where the network side device fails to receive the identifier of the first HARQ process.

14. The information transmission method according to claim 8, wherein the feedback information comprises: a new data indicator, and/or a redundancy version identifier.

15. A network side device, comprising: a transceiver, a memory, a processor, and a computer program stored in the memory and configured to be executed by the processor, wherein the processor is configured to execute the computer program to implement the steps of the method according to claim 8.

16. A terminal, comprising: a transceiver, a memory, a processor, and a computer program stored in the memory and configured to be executed by the processor, wherein the processor is configured to execute the computer program to implement following steps:
receiving, from a network side device, feedback information for a first uplink data;
determining, according to the feedback information, an identifier of a first hybrid automatic repeat request (HARQ) process corresponding to the first uplink data not successfully received by the network side device; and
performing data retransmission according to the identifier of the first HARQ process,
wherein the feedback information does not indicate the identifier of the first HARQ process, and the feedback information is used for scheduling retransmission of the first uplink data, or, the feedback information is used for indicating that transmission of the first uplink data is unsuccessful;
wherein the retransmission data comprises the identifier of the first HARQ process;
wherein the feedback information comprises a sending time of the first uplink data;
the determining, according to the feedback information, the identifier of the first HARQ process corresponding to the first uplink data not successfully received by the network side device specifically comprises:
determining, according to the sending time of the first uplink data, the identifier of the first HARQ process corresponding to the sending time of the first uplink data;
or,
wherein the feedback information comprises a second HARQ process identifier;
the determining, according to the feedback information, the identifier of the first HARQ process corresponding to the first uplink data not successfully received by the network side device specifically comprises:
determining, according to the second HARQ process identifier, the identifier of the first HARQ process corresponding to the second HARQ process identifier;
or,
wherein the feedback information comprises index information of a configured grant (CG);
the determining, according to the feedback information, the identifier of the first HARQ process corresponding to the first uplink data not successfully received by the network side device specifically comprises:
determining, according to the index information of the CG, a CG resource used for sending the first uplink data; and
determining, according to the CG resource, the identifier of the first HARQ process corresponding to the CG resource.

* * * * *